Oct. 7, 1969  R. G. HUNE ET AL  3,470,904

FLUTTER CHECK POPPET VALVE

Filed July 7, 1967

INVENTORS
Ronald G. Hune and
Robert F. Boehm.
BY
Buell Blenko & Ziesenheim
ATTORNEY

United States Patent Office 3,470,904
Patented Oct. 7, 1969

3,470,904
FLUTTER CHECK POPPET VALVE
Ronald G. Hune, Sugarland, and Robert F. Boehm, Stafford, Tex., assignors to E-I-M Company Incorporated, Missouri City, Tex., a corporation of Texas
Filed July 7, 1967, Ser. No. 651,761
Int. Cl. F16k 17/26, 45/00; E03c
U.S. Cl. 137—493.2                                      7 Claims

ABSTRACT OF THE DISCLOSURE

A poppet valve is provided with a flapper or flutter type check valve in tandem with the main valve member. The check valve is arranged so that fluid can flow in one direction unimpeded therethrough. When fluid flows in the opposite direction the check valve causes the valve stem on which the check valve and the main valve member are mounted to be displaced a greater distance from the cam operator or other mechanism usually provided for reciprocating or otherwise actuating the valve stem. Thus, any possibility of jamming or chattering between the valve stem and the operating mechanism is completely eliminated.

---

The present invention relates to an improved poppet valve or the like of the type usually actuated by a cam or cam-latch operator and having novel means incorporated in the valve to prevent components of the valve from jamming the cam latch or other operating mechanism.

In certain applications, such valves are coupled to the supply and exhaust ducts of a fluid motor or similar cyclic system and are opened and closed at predetermined intervals in the operating cycle of the motor to conduct actuating fluid to the motor and to permit exhaust to flow from the motor. Because of the cyclic action of the valves and of the cyclic flows of fluid therethrough, it frequently happens that an unexpected reversal of the fluid, when otherwise flowing forwardly through the poppet valve, causes the poppet valve stem to extend prematurely and to jam the cam-latch operator or other operating mechanism. This inadvertently interrupts the operation of the system controlled by the valves and may also result in damage to the valve and/or its operator. Even if the latch mechanism is not jammed, in many applications of poppet valves, such as with a vane type air motor having a pulsating exhaust, the resulting fluctuations of the valve stem during the exhaust portion of the operating cycle cause intermittent engagement between the stem and the operating latch or cam with the result that wearing of these parts is rapidly accelerated.

We overcome these difficulties by providing a flapper or flutter type check valve member in tandem with the valve member usually provided in the poppet valve or the like. The check valve member is arranged so that fluid can flow in one direction, for example the reverse direction substantially unimpeded therethrough. When fluid flows in the opposite direction for example the forward direction, the fluid pressure acting upon the flutter check displaces the flutter check and the valve stem on which it is mounted a greater distance from the valve operating mechanism. Any possibility of jamming between the valve stem and the latch mechanism is thereby completely eliminated. Furthermore, the greater spacing therebetween allows the valve stem to fluctuate in those applications where a pulsating fluid is applied to the valve, without repetitively engaging the latch mechanism. Accordingly, wearing of the operating mechanism and valve components is likewise eliminated.

We accomplish these desirable results by providing a valve construction comprising a housing having an annular valve seat positioned therein, and defining a flow opening therethrough, a valve stem and primary valve member mounted in said housing for movement of said valve member toward and away from said valve seat, a secondary valve member spacedly mounted on said valve stem relative to said primary valve member, said secondary valve member having flow aperture means therein and being shaped for closely fitting insertion into said flow opening, and said secondary valve member in addition having closing means mounted thereon for checking the flow of fluid through said aperture means in one direction relative to said flow opening.

In other arrangements of our novel valve construction, said closing means is an annular flexible member mounted on said secondary valve member in normally closed relationship to said aperture means. In still other arrangements, said valve stem is biased to the closing position of said primary valve member, and a latch mechanism is mounted adjacent a protruding end of said valve stem to prevent periodically the closing of said primary valve member by said biasing means, said valve stem being mounted for reciprocation within said casing and having an end protruding therefrom.

We also provide a valve construction in which a seat engaging sealing ring can be readily and quickly replaced without completely disassembling the valve and in which the valve member having the sealing ring mounted thereon includes a disc having a beveled outer edge and adjacently mounted on said valve stem, said primary valve member in addition having a circumferentially extending lip spaced from said beveled edge to define a restricted sealing ring receiving recess therebetween, and a sealing ring is seated in said recess.

We also desirably provide a valve construction comprising a housing having a pair of ports and a passageway therebetween, valve seat means positioned on said passageway, a valve stem and primary valve member mounted in said housing for movement of said valve member toward and away from said valve seat means, a secondary valve member spacedly mounted on said valve stem at a fixed distance from said primary valve member, said secondary valve member having flow aperture means therein and being shaped for closely fitting and sealing insertion into said passageway, said secondary valve member in addition having closing means mounted thereon for checking the flow of fluid through said aperture means in one direction relative to said passageway, and means for moving said valve stem to a first position whereat both of said valve members are spaced from said seat means and said passageway and to a second position whereat said primary valve member is spaced from said seat means but said secondary valve member is inserted into said passageway and to a third position whereat said primary valve member is engaged with said seat means while said secondary valve member is inserted into said passageway.

During the foregoing discussion, various objects, features and advantages of the invention have been alluded to. These and other objects, features and advantages of the invention together with structural details thereof will be elaborated upon during the forthcoming description of presently preferred embodiments of the invention and presently preferred methods of practicing the same.

In the accompanying drawings we have shown certain presently preferred embodiments of the invention and have illustrated certain presently preferred methods of practicing the same, wherein.

Although the invention is described primarily in connection with poppet valves employed for controlling the action of a fluid motor, it will be obvious as this description unfolds that the valve construction of our invention is capable of other applications wherein the valve is subjected to cyclic operation.

Figure 1:
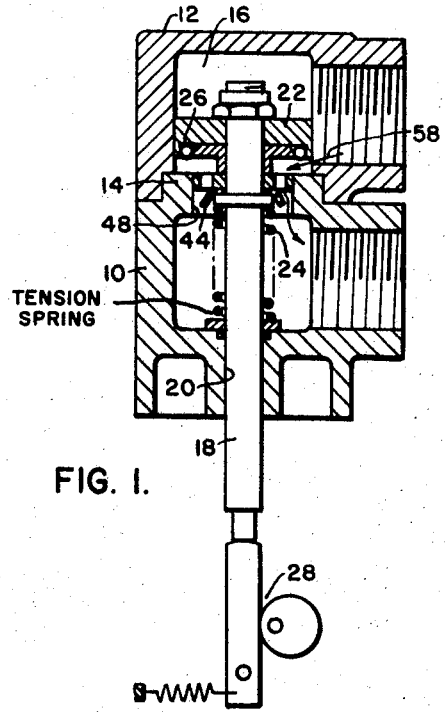
FIGURE 1 is a vertically sectioned view of a poppet valve or the like and cam-latch operated therefor showing one operational position of the valve.

Referring now more particularly to the drawings and initially to FIGURE 1 thereof the exemplary form of our novel poppet valve shown therein comprises a bipartite housing having a motor port or load section 10 and a supply-exhaust section 12. The housing section 10 includes an annular valve seat member 14 which in this example is of planar configuration and is extended into the valve member cavity 16 of the housing section 12. The annular seat member 14 defines a flow opening 48 extending therethrough and described more fully below.

Figure 3:
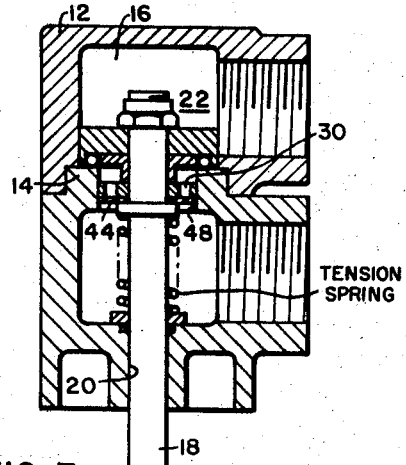
FIGURE 3 is a similar view showing a third operational position of the valve.

A valve stem 18 is mounted for reciprocation through a closely fitting aperture 20 of the housing section 10 and extends into the valve member cavity 16 of the housing section 12. A valve member 22 is secured adjacent the inward end portion of the valve 18 and thus is mounted for reciprocatory movement within the cavity 16 toward and away from the valve seat member 14. The valve stem 18 is biased toward the closed position of its valve member 22, as better shown in FIGURE 3 by means of a tensed coil spring 24. For sealing engagement with the valve seat 14 at the closed position of the valve member 22, a sealing O-ring 26 is positioned on the underside thereof, as viewed in the drawings.

Figure 2:
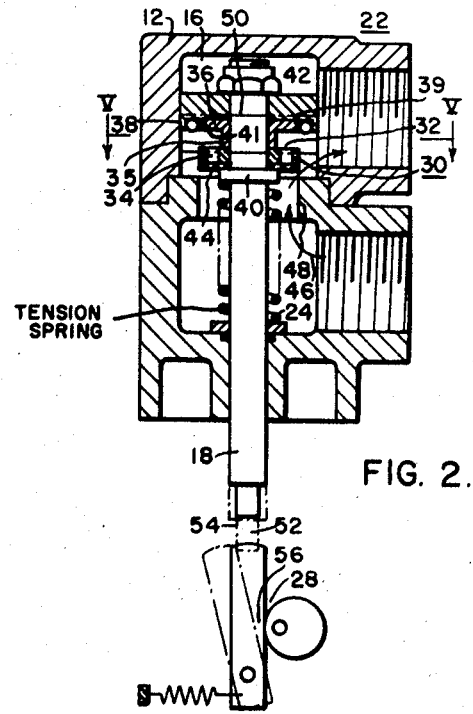
FIGURE 2 is a similar view of a second operational position of the valve.
Figure 5:
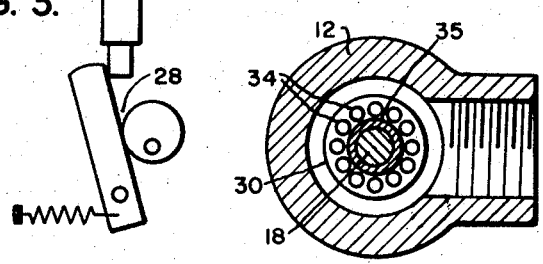
FIGURE 5 is a cross sectional view of the poppet valve shown in the preceding figures and taken along reference line V—V of FIGURE 2.

In order to impart a greater throw or range of movement to the valve stem 18, a secondary valve member 30 as shown in FIGURE 2 of the drawings is also mounted on the valve stem 18 for reciprocation thereby together with the main or primary valve member 22. In this example the secondary valve member 30 includes an apertured disc 32, as better shown in FIGURE 5, provided with a number of flow apertures 34. The disc 32, can for example, be fabricated integrally with another disc 36 spaced therefrom by the tubular spacer 35 and forming in this example part of the primary valve member 22 and forming in cooperation with a circumferentially depending lip 38 of the valve member 22, a recess 39 therebetween for the O-ring 26.

In furtherance of this purpose the disc 36 is provided with a beveled outer edge 41 with the bevel being directed to define a restricted entrance to annular recess 39 formed between edge 41 and the lip 38. The beveled edge 41 thus aids in retaining the sealing O-ring 36 within the recess 39. In most cases the sealing O-ring 36, being resilient, can be removed and replaced by lightly forcing it through the restricted entrance without completely disassembling the valve construction.

The valve discs 22, 30 are urged against a stop or journal 40 on the valve stem 18 by means of mounting nut 42 or other suitable fastening means. Retained between the stop 40 and the secondary valve disc 32 is an annular diaphragm 44 having about the same inner and outer diameters as those of the secondary valve disc 32. In this arrangement the flexible diaphragm 44 underlies the apertures 34 of the secondary valve disc 32 so that when fluid is exhausted from the motor or other load device as denoted by arrow 46 the pressure thereof upon the diaphragm 44 tends to close more tightly the flow apertures 44. In furtherance of this purpose secondary valve member 30 initially extends in closely fitting engagement into the aforementioned valve seat opening 48 of the housing section 10, as better shown in FIGURES 1 and 3 of the drawings. Accordingly, when the flow of fluid through the valve is in the direction as denoted by arrow 46 it will be seen that the valve stem is forced farther upwardly against the action of the biasing spring 24 in comparison to a conventional poppet valve member without the second valve 30, as denoted by chain outline 50 thereof. This causes the valve stem 18 to be separated a distance 52 from the cam-latch mechanism 28 and to prevent any possibility of jamming therefrom which otherwise frequently occurs as denoted by chain outlines 54 and 56 of the lower valve stem portion of a conventional valve and of the cam-latch operating mechanism respectively. Moreover, the provision of the space 52 permits oscillation of the valve stem 18 without contacting the adjacent end of the cam latch 28, when a pulsating fluid is applied to the valve.

However, when the flow of fluid is reversed through the valve as better shown in FIGURE 1 the pressure thereof causes the flexible diaphragm or flapper 44 to be displaced from the secondary valve apertures 34 and to permit a normal flow of supply fluid to the motor or other load device as denoted by arrow 58. In the latter position of the valve stem 18 the secondary valve 30 is retracted within the cylindrical throat 48 so that the incoming fluid is primarily controlled by the valve member 22, as better shown in FIGURE 3. When disengagement of the cam latch 28 permits the primary valve member 22 to engage the seat 14 the flow of fluid through the valve is stopped in the normal manner. At such time the secondary valve member 30 is farther recessed into the valve seat opening 48, in this example.

Figure 4:
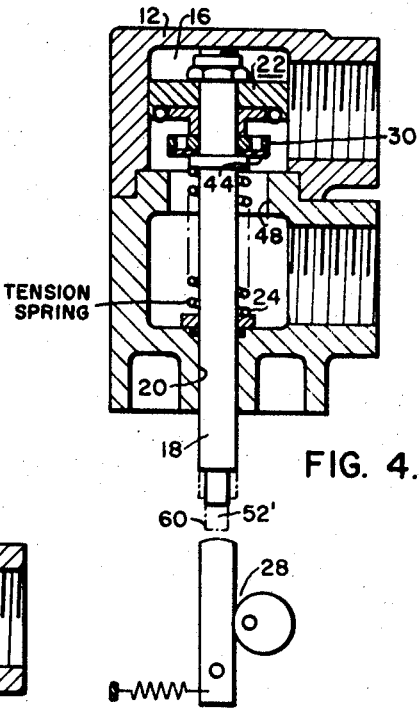
FIGURE 4 is a similar view of a fourth operational position of the valve.

Finally, as seen in FIGURE 4 when pressurized fluid is exhausted from the motor or other load device, the sudden expulsion thereof again carries the valve stem a considerable distance 52' above the latch mechanism 28. Here again the greater throw imparted to the valve stem 18 by provision of the secondary valve member 30 is indicated by the chain outline 60 of the valve stem 18 and primary valve member 22 when not provided with the secondary valve member 30. In the latter operational position of the poppet valve, as seen in FIGURE 4, the diaphragm 44 remains closed as described above with reference to FIGURE 2. The greater throw imparted to the valve stem 18 in the valve position of FIGURE 4 thus allows additional time for the latch mechanism 28 to be returned to its starting position as shown in FIGURE 1. Thus, the greater clearance 52' in FIGURE 4 eliminates the necessity of extreme accuracy in the positioning of the latch mechanism 28, as formerly required by the very close spacing between the latch member thereof and the chain outline position 60 of a conventional valve stem.

From the foregoing it will be apparent that novel and efficient forms of poppet valves have been disclosed herein. Our poppet valves afford novel valve constructions having a greater throw of the valve stem through the provision of our novel flutter check or secondary valve member, and having a novel seating arrangement for the primary valve member thereof. As explained previously this greater throw is essential in assuring accuracy of valve operation, eliminating malfunctioning caused by jamming thereof, and in minimizing wearing of the latch mechanism frequently utilized therewith. Accordingly, while we have shown and described certain presently preferred embodiments of the invention and have illustrated presently preferred methods of practicing the same, it is to be distinctly understood that the invention is not limited thereto but may be otherwise variously embodied and practiced.

We claim:

1. A valve construction comprising a housing having a pair of ports and a passageway therebetween, valve seat means positioned on said passageway, a valve stem and primary valve member mounted in said housing for movement of said valve member toward and away from said valve seat means, a secondary valve member spacedly mounted on said valve stem at a fixed distance from said primary valve member, said secondary valve member having flow aperture means therein and being shaped for closely fitting and sealing insertion into said passageway, said secondary valve member in addition having closing means mounted thereon for checking the flow of fluid through said aperture means in one direction relative to said passageway, and means for moving said valve stem to a first position whereat both of said valve members are spaced from said seat means and said passageway and to a second position whereas said primary valve member is spaced from said seat means but said secondary valve member is inserted into said passageway and to a third position whereat said primary valve member is engaged with said seat means while said secondary valve member is inserted into said passageway.

2. The combination according to claim 1 wherein said closing means is an annular flexible member mounted on said secondary valve member in normally closed relationship to said aperture means.

3. The combination according to claim 1 wherein said valve stem is biased to the third or closing position of said primary valve member, and a latch mechanism is mounted adjacent a protruding end of said valve stem to prevent periodically the closing of said primary valve member by said biasing means, and said valve stem being mounted for reciprocation within said casing and having an end protruding therefrom.

4. The combination according to claim 1 wherein a stop is provided on said valve stem adjacent said valve seat means and said primary valve member, and said secondary valve member and said closing means are mounted on said valve stem in tandem between said stop and fastening means provided therefor on said stem.

5. The combination according to claim 1 wherein said primary valve member includes a retaining disc having a beveled outer edge and adjacently mounted on said valve stem, said primary valve member in addition having a circumferentially extending lip spaced from said beveled edge to define a restricted sealing ring receiving recess therebetween, and a sealing ring is seated in said recess for engagement with said valve seat means.

6. A valve construction comprising a housing having a pair of ports and a passageway therebetween, valve seat means positioned on said passageway, a valve stem and a primary valve member mounted in said housing for movement of said valve member toward and away from said valve seat means for engagement therewith, a secondary valve member spacedly mounted on said valve stem at a fixed distance from said primary valve member, said secondary valve member having a flow aperture means therein and being shaped for closely fitting and sealing insertion into said passageway, said secondary valve member in addition having closing means mounted thereon for checking the flow of fluid through said aperture means in one direciton relative to said passageway.

7. The combination according to claim 6 wherein said primary and said secondary valve members are so spaced relative to the length of the said passageway that said secondary valve member remains inserted within said passageway throughout a predetermined range of opening and closing movements of said primary valve member relative to said seat means.

References Cited

UNITED STATES PATENTS

| | | | |
|---|---|---|---|
| 553,498 | 1/1896 | Fernley | 137—599.2 |
| 961,735 | 6/1910 | Schutt. | |
| 1,203,111 | 10/1916 | Gyurcsina | 137—599.2 |
| 1,713,115 | 5/1929 | Cousine. | |
| 2,678,187 | 5/1954 | Peters. | |
| 2,833,308 | 5/1958 | Berry | 137—596.18 XR |
| 2,935,075 | 5/1960 | Ringer | 137—493.1 XR |

WILLIAM F. O'DEA, Primary Examiner

ROBERT G. NILSON, Assistant Examiner

U.S. Cl. X.R.

137—614.17

UNITED STATES PATENT OFFICE
CERTIFICATE OF CORRECTION

Patent No. 3,470,904                   October 7, 1969

Ronald G. Hune et al.

It is certified that error appears in the above identified patent and that said Letters Patent are hereby corrected as shown below:

Column 2, line 69, "operated" should read -- operator --. Column 3, line 28, after "valve" insert -- stem --. Column 4, line 8, "therefrom" should read -- thereof --. Column 6, line 11, cancel "a"; line 31, "Cousine" should read -- Cousino --.

Signed and sealed this 20th day of October 1970.

(SEAL)
Attest:

Edward M. Fletcher, Jr.                  WILLIAM E. SCHUYLER, JR.
Attesting Officer                           Commissioner of Patents